(12) United States Patent
Jacobson et al.

(10) Patent No.: US 9,964,200 B2
(45) Date of Patent: May 8, 2018

(54) SLEWING RING GREASE ASSEMBLY

(71) Applicant: Genesis Attachments, LLC, Superior, WI (US)

(72) Inventors: Daniel P. Jacobson, Wrenshall, MN (US); Chad Wood, Duluth, MN (US); Daniel J. Raihala, Superior, WI (US); Steven T. Letko, Hermantown, MN (US)

(73) Assignee: Genesis Attachments, LLC, Superior, WI (US)

( * ) Notice: Subject to any disclaimer, the term of this patent is extended or adjusted under 35 U.S.C. 154(b) by 189 days.

(21) Appl. No.: 14/783,540

(22) PCT Filed: Apr. 9, 2013

(86) PCT No.: PCT/US2013/035810
§ 371 (c)(1),
(2) Date: Oct. 9, 2015

(87) PCT Pub. No.: WO2014/168610
PCT Pub. Date: Oct. 16, 2014

(65) Prior Publication Data
US 2016/0047460 A1    Feb. 18, 2016

(51) Int. Cl.
*F16H 57/04* (2010.01)
*B66C 1/42* (2006.01)
*B66C 13/00* (2006.01)
*F16C 11/04* (2006.01)

(52) U.S. Cl.
CPC ........... *F16H 57/0464* (2013.01); *B66C 1/42* (2013.01); *B66C 1/427* (2013.01); *B66C 13/00* (2013.01); *F16C 11/04* (2013.01)

(58) Field of Classification Search
CPC ....... F16H 57/0464; B66C 1/42; B66C 1/427; B66C 13/00; F16C 11/04
See application file for complete search history.

(56) References Cited

U.S. PATENT DOCUMENTS

| 2,614,660 | A | * | 10/1952 | House | F16N 21/00 138/172 |
| 3,554,324 | A | * | 1/1971 | Watley | F16N 21/04 141/329 |
| 3,658,154 | A | * | 4/1972 | Benko, Jr. | F16N 21/00 184/105.3 |

(Continued)

*Primary Examiner* — Michael A Riegelman
(74) *Attorney, Agent, or Firm* — Thomas J. Oppold; Larkin Hoffman Daly & Lindgren, Ltd.

(57) ABSTRACT

A slewing ring grease assembly for providing grease to internal gear teeth of a slewing ring. The slewing ring grease assembly includes a bulkhead fitting having a flange and a shaft, the shaft extends through a hole in the bulkhead attached to the slewing ring such that the shaft extends over the internal gear teeth of the slewing ring. The bulkhead fitting flange is secured to the bulkhead on a side opposite the internal gear teeth of the slewing ring. A passage through the bulkhead fitting is provided which is capable of delivering grease through the bulkhead fitting and onto the internal gear teeth of the slewing ring. The grease assembly may include a wall fitting extending through a wall of housing supporting the bulkhead and a connecting tube capable of delivering grease from the wall fitting to the passage of the bulkhead fitting.

22 Claims, 7 Drawing Sheets

(56) References Cited

U.S. PATENT DOCUMENTS

| | | | | |
|---|---|---|---|---|
| 3,743,054 | A * | 7/1973 | Jones, Jr. | B62D 53/0842 184/14 |
| 4,595,080 | A * | 6/1986 | Shay | B60B 27/00 184/105.3 |
| 4,667,774 | A * | 5/1987 | Roberge | F16H 1/14 184/6.12 |
| 5,284,223 | A * | 2/1994 | Fisher | F16N 19/003 184/108 |
| 5,417,308 | A * | 5/1995 | Hartl | B62D 53/0885 184/100 |
| 5,526,899 | A * | 6/1996 | Billings | B60G 5/03 184/105.3 |
| 5,957,000 | A * | 9/1999 | Pecorari | F16C 33/78 74/425 |
| 7,216,575 | B2 * | 5/2007 | Alseth | B23D 31/008 30/134 |
| 9,169,970 | B2 * | 10/2015 | Gillespie | F16N 7/38 |
| 2007/0116394 | A1 * | 5/2007 | Hart | B66C 23/84 384/513 |
| 2011/0227355 | A1 * | 9/2011 | Raihala | E02F 3/4135 294/106 |
| 2012/0299321 | A1 * | 11/2012 | Raihala | B66C 3/16 294/201 |
| 2014/0060974 | A1 * | 3/2014 | Gagan | F16N 21/02 184/105.3 |

\* cited by examiner

SLEWING RING GREASE ASSEMBLY

BACKGROUND

Gear tooth bearings or slewing rings are typically used when it is desired to rotate a large or heavy structure relative to a stationary or non-rotatable structure. Slewing rings are commonly used in material handling attachments, such as demolition shear attachments, concrete crusher attachments, grapple attachments, and the like, which are adapted to attach to the boom or stick of an excavator. Slewing rings are also utilized on excavators for rotating the platform supporting the cab and boom relative to the undercarriage of the excavator. Other applications for slewing rings are also well known.

Slewing rings have an internal race which is supported by and rotatable relative to an outer race. The inner race is rotated relative to the outer race using a hydraulic gear drive which engages internal gear teeth of the inner race. The gear teeth of the gear drive and slewing ring must be regularly greased to reduce friction and minimize wear. However, because the gear teeth are circumferentially enclosed by the outer race and are enclosed at each end by the mounting plates or bulkheads which attach to the inner race and outer races, the gear teeth are inaccessible without removing one of the bulkheads or mounting plates.

One type of prior art grease assembly that has been used for providing grease to the internal gear teeth of the slewing ring of a swivel attachment for material handling attachments, involves drilling a hole through the bulkhead and tapping both ends of the hole with internal threads. A grease fitting is threaded into the tapped hole on the back side of the bulkhead and a bent steel or copper tube with a pipe fitting is then threaded into the tapped hole on the front side of the bulkhead. When the slewing ring is mounted to the swivel house and to the material handling attachment, a grease gun can be placed over the grease fitting on the back side of the bulkhead and grease can be pumped through the hole in the bulkhead and into internal tube which directs and delivers the grease to the internal gear teeth of the slewing ring.

While such slewing ring grease assemblies serve their intended purpose, they often fail over time because the internal tube and/or pipe fitting unthreads from the tapped hole due to vibration and rotation of the material handling attachment during use. Once unthreaded, the internal tube will fall inside the slewing ring and will get crushed between the gear teeth as the material handling attachment is rotated, which can result in damage and/or increased wear of the gear teeth. Additionally, without the internal tube in place, grease cannot be properly directed and delivered to the gear teeth, resulting in increased wear and decreased life of the slewing ring. Furthermore, it should be appreciated that the internal tube cannot be recovered and replaced without removing the slewing ring from the swivel house, resulting in considerable down-time.

DESCRIPTION

Figure 1:
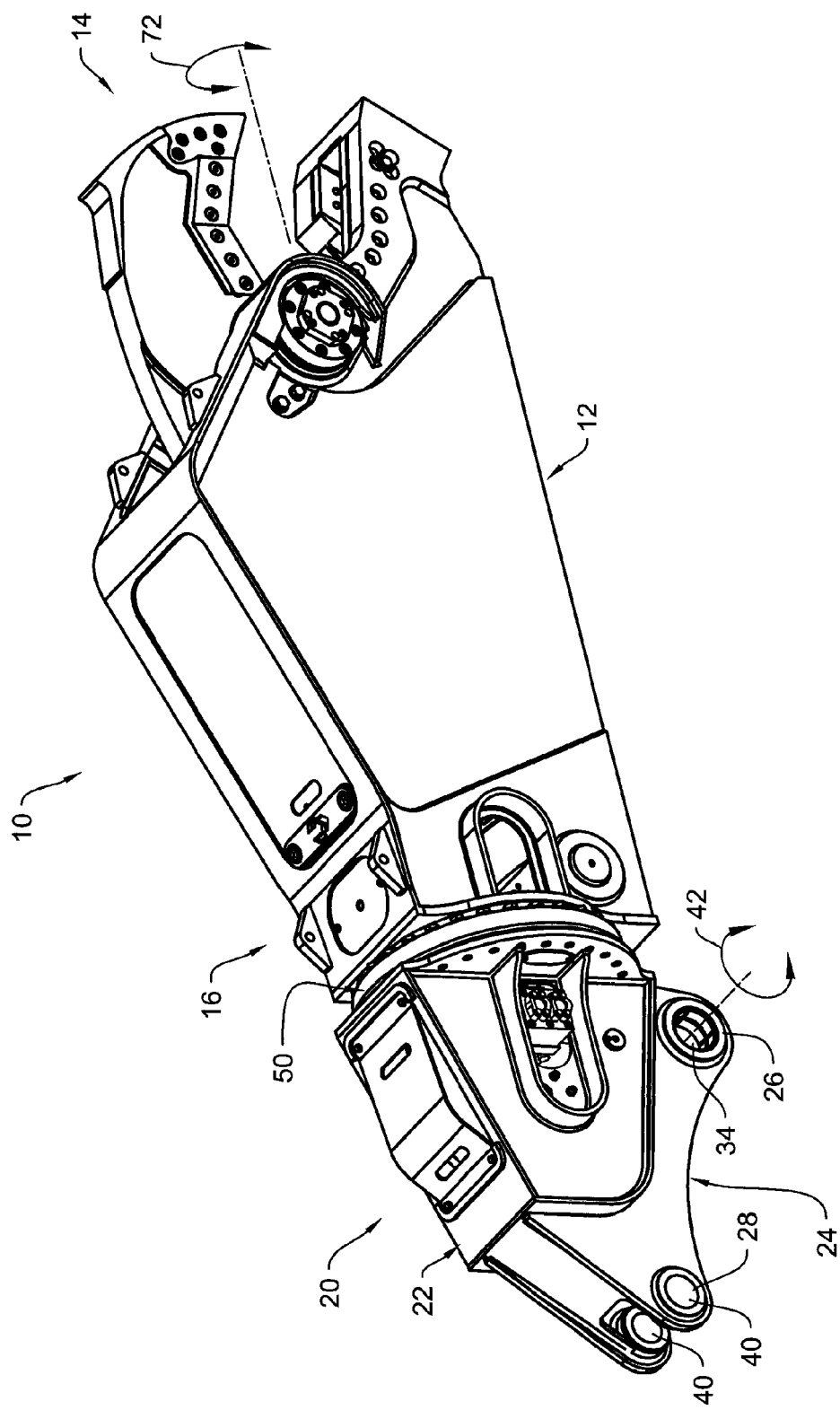
FIG. 1 is a perspective view of an embodiment of a demolition shear attachment with an embodiment of a swivel attachment mounted to the rearward end of the main body of the shear attachment.

Referring to the drawings wherein like reference numerals designate the same or corresponding parts throughout the several views, FIG. 1 is a perspective view of an embodiment of a material handling attachment 10 having a main body 12 with a forward end 14 and a rearward end 16. The forward end 14 of the main body 12 operably supports material handling jaws or other material handling elements.

Although a demolition shear attachment is illustrated in the drawing figures and is referenced in this specification, it should be understood that the term "material handling attachment" as used herein and in the claims refers to and includes any type of material handling attachment, including, but not limited to, demolition shear attachments, concrete crusher attachments, grapple attachments, and the like.

Figure 2A:
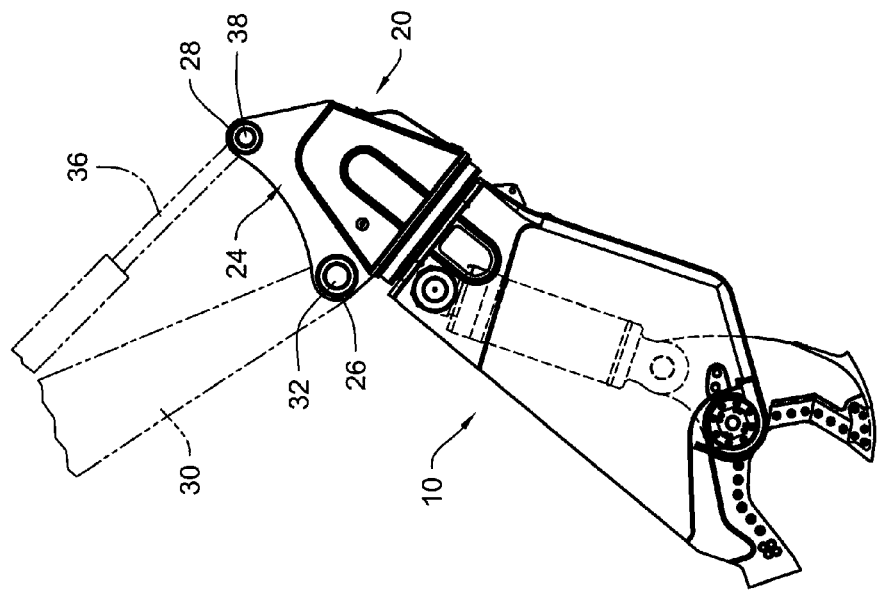
FIG. 2 shows the shear attachment and swivel attachment of FIG. 1 mounted to the boom of an excavator.
Figure 2B:
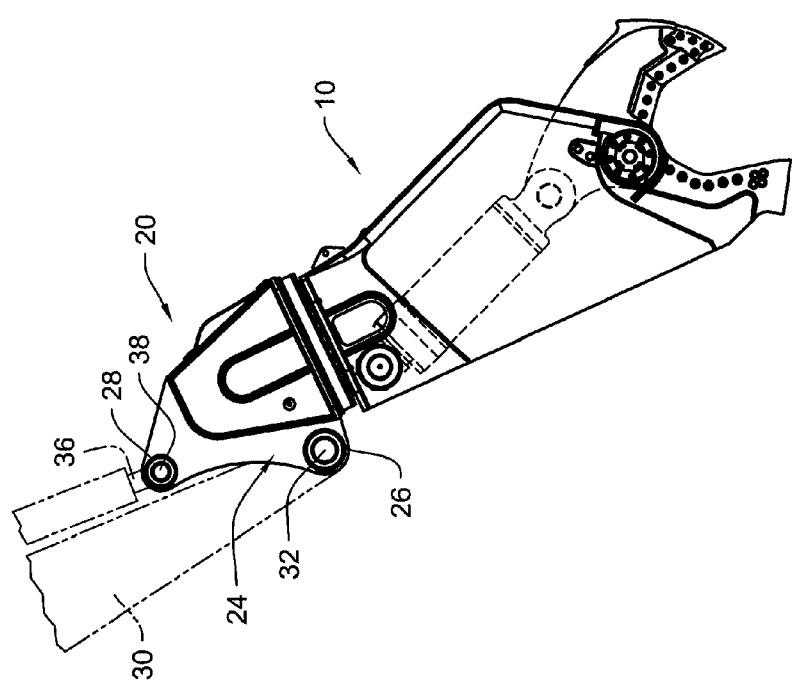

A swivel attachment 20 is shown mounted to the rearward end 16 of the main body 12. The swivel attachment 20 includes a swivel house 22 which supports a boom mount bracket 24 at its lower rearward end and a gear tooth bearing or slewing ring 50 at its forward end. The boom mount bracket 24 includes a forward boom mount 26 and a cylinder mount 28. As illustrated in FIGS. 2A and 2B, the excavator boom or stick 30 pivotally mounts to the forward boom mount 26 by a boom pin 32 extending through aligned holes 34 (FIG. 1) in the forward boom mount 26 and through a mating hole (not shown) in the end of the excavator boom 30. The hydraulic cylinder rod 36 at the end of the excavator boom 30 pivotally mounts to the cylinder mount 28 by a cylinder pin 38 extending through aligned holes 40 (FIG. 1) in the cylinder mount 28 and through a mating hole (not shown) in the clevis end of the cylinder rod 36. As illustrated in FIGS. 2A and 2B, the material handling attachment 10 may be pivoted about the axis of the boom pin 32 as indicated by arrow 42 (FIG. 1), by extending and retracting the cylinder rod 36 on the excavator boom 30.

Figure 3:
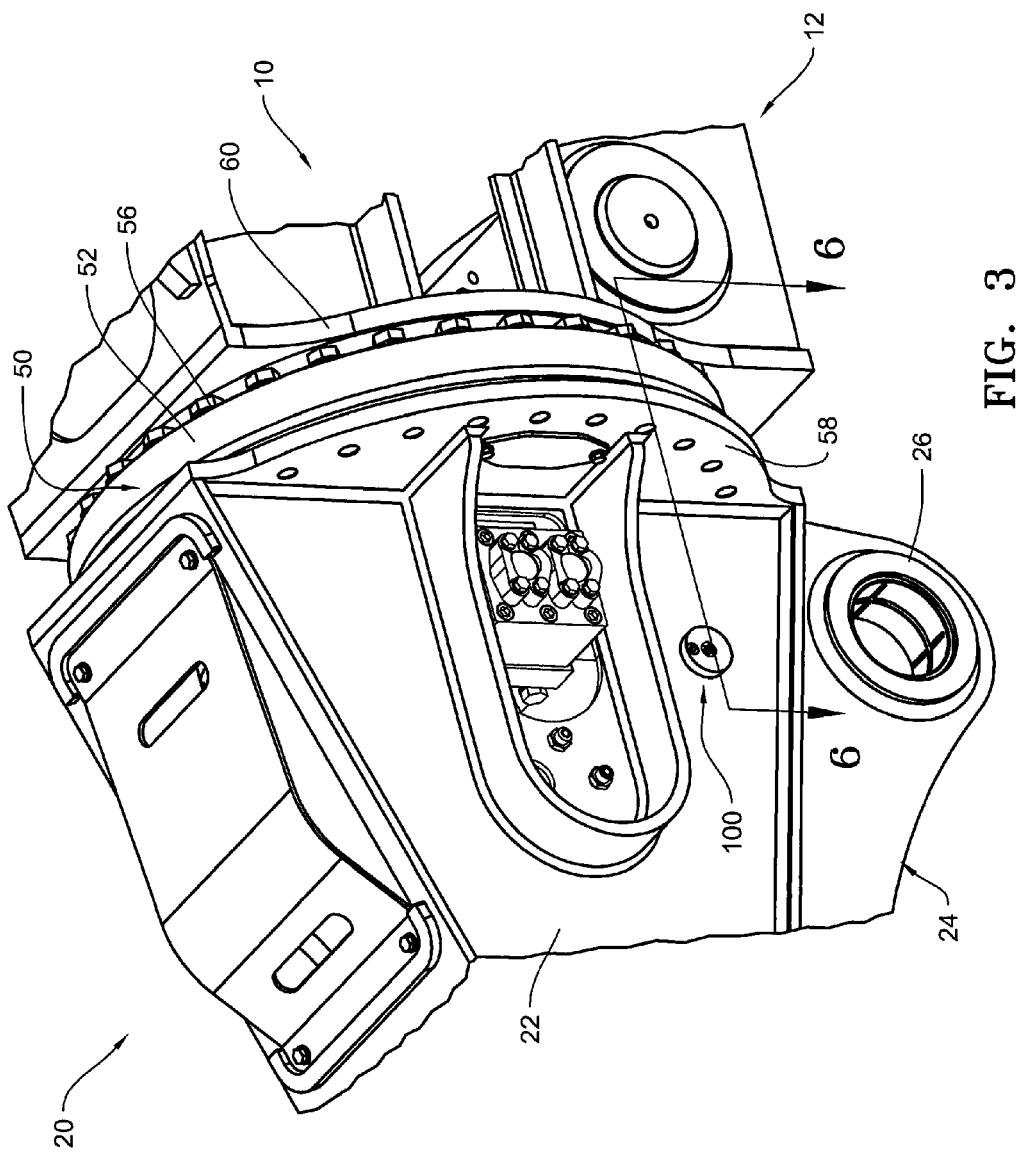
FIG. 3 is an enlarged view of a portion of the swivel attachment of FIG. 1.
Figure 4:
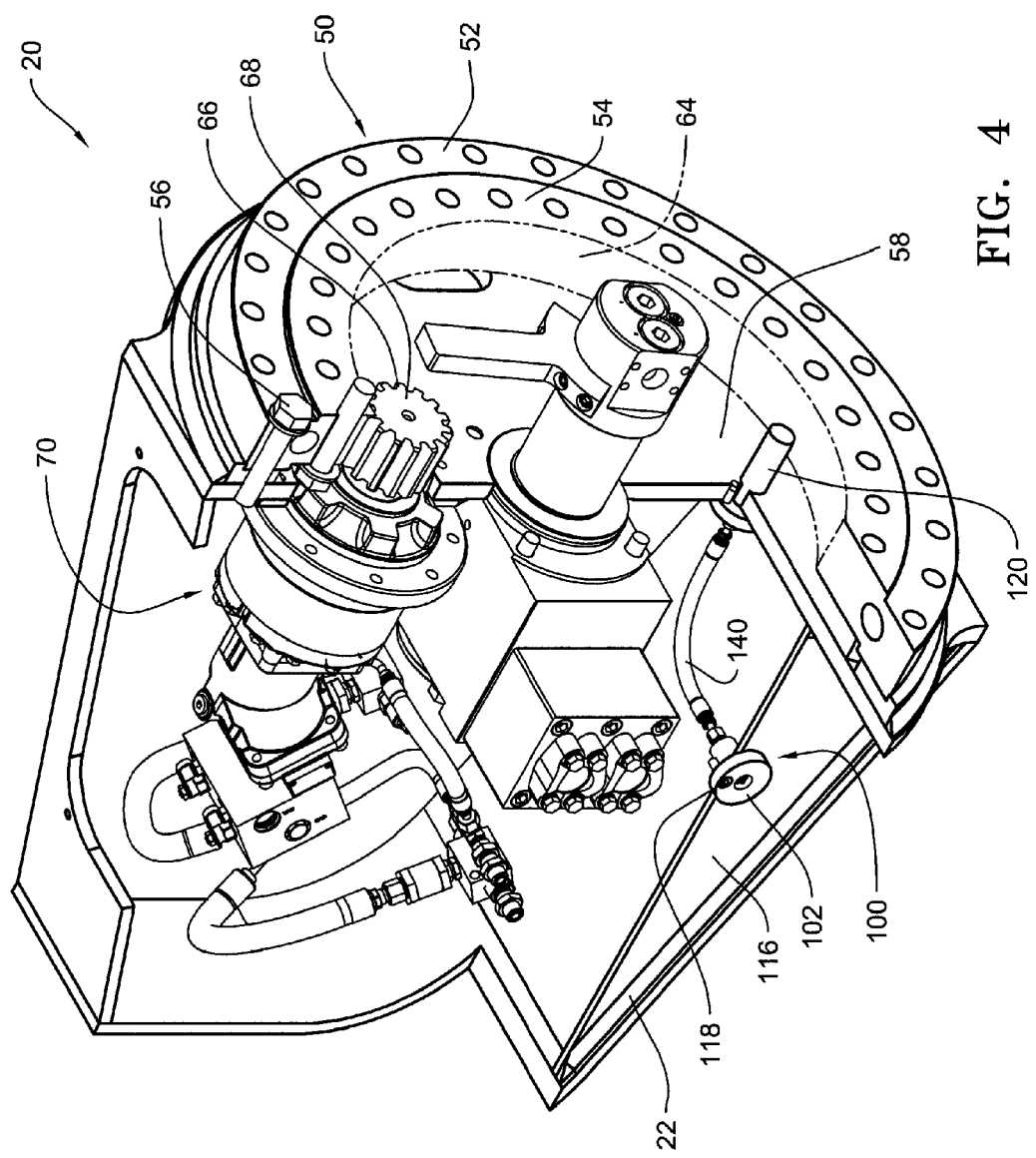
FIG. 4 is a partial cut-away, front perspective view of the swivel attachment of FIG. 1 showing an embodiment of an improved slewing ring grease assembly.
Figure 6:
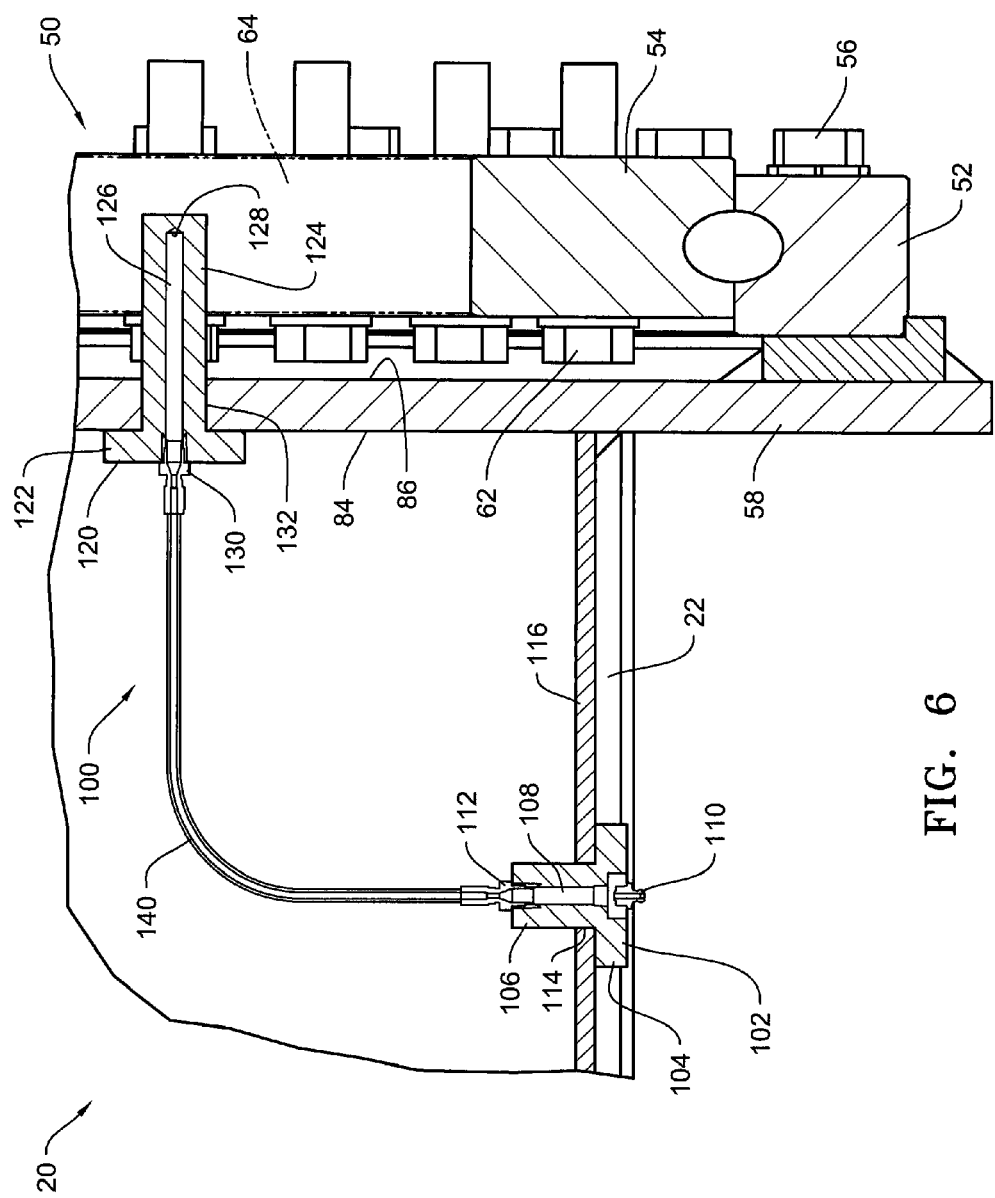
FIG. 6 is a cross-sectional view of the slewing ring grease assembly as viewed along lines 6-6 of FIG. 3.

Referring to FIGS. 3 and 4 and FIG. 6 (which is a partial cross-sectional view of the swivel attachment 20 as viewed along line 6-6 of FIG. 3), gear tooth bearing or slewing ring 50 at the rearward end 16 of the main body 12 of the material handling attachment 10. The slewing ring 50 includes a stationary outer race 52 and an inner race 54 (FIGS. 4 and 6) which is rotatable within the stationary outer race 52. The stationary outer race 52 is secured by threaded connectors 56 to a bulkhead 58 at the forward end of the swivel house 22. The inner race 54 is secured to a mounting plate 60 (FIG. 3) at the rear end of the main body 12 of the material handling attachment by threaded connectors 62 (FIG. 6). The inner race 54 has internal gear teeth 64 (designated by the phantom line in FIG. 4). The internal gear teeth 64 of the inner race 54 are engaged by external gear teeth 66 of the gear 68 projecting through the bulkhead 58. The gear 68 is rotated by the hydraulic gear drive 70 secured within the swivel house 22. Thus, it should be appreciated that as the hydraulic gear drive 70 rotates the gear 68, the external gear teeth 66 engage the internal gear teeth 64 of the inner race 54 causing the main body 12 of the material handling attachment to rotate or swivel about the central axis of the slewing ring 50 as indicated by arrow 72 in FIG. 1.

To reduce friction and wear of the gear teeth 64, 66, it is necessary to ensure that the teeth are adequately lubricated with grease. However, it should be appreciated that the gear teeth 64, 66 are enclosed circumferentially by the outer race 52, and laterally by the bulkhead 58 and mounting plate 60 such that the gear teeth are inaccessible. Accordingly, swivel attachments have incorporated a grease assembly which directs and delivers the grease pumped from a grease gun through the bulkhead 58 and onto the internal gear teeth 64 of the inner race 54 of the slewing ring 50.

Figures 7, 8:
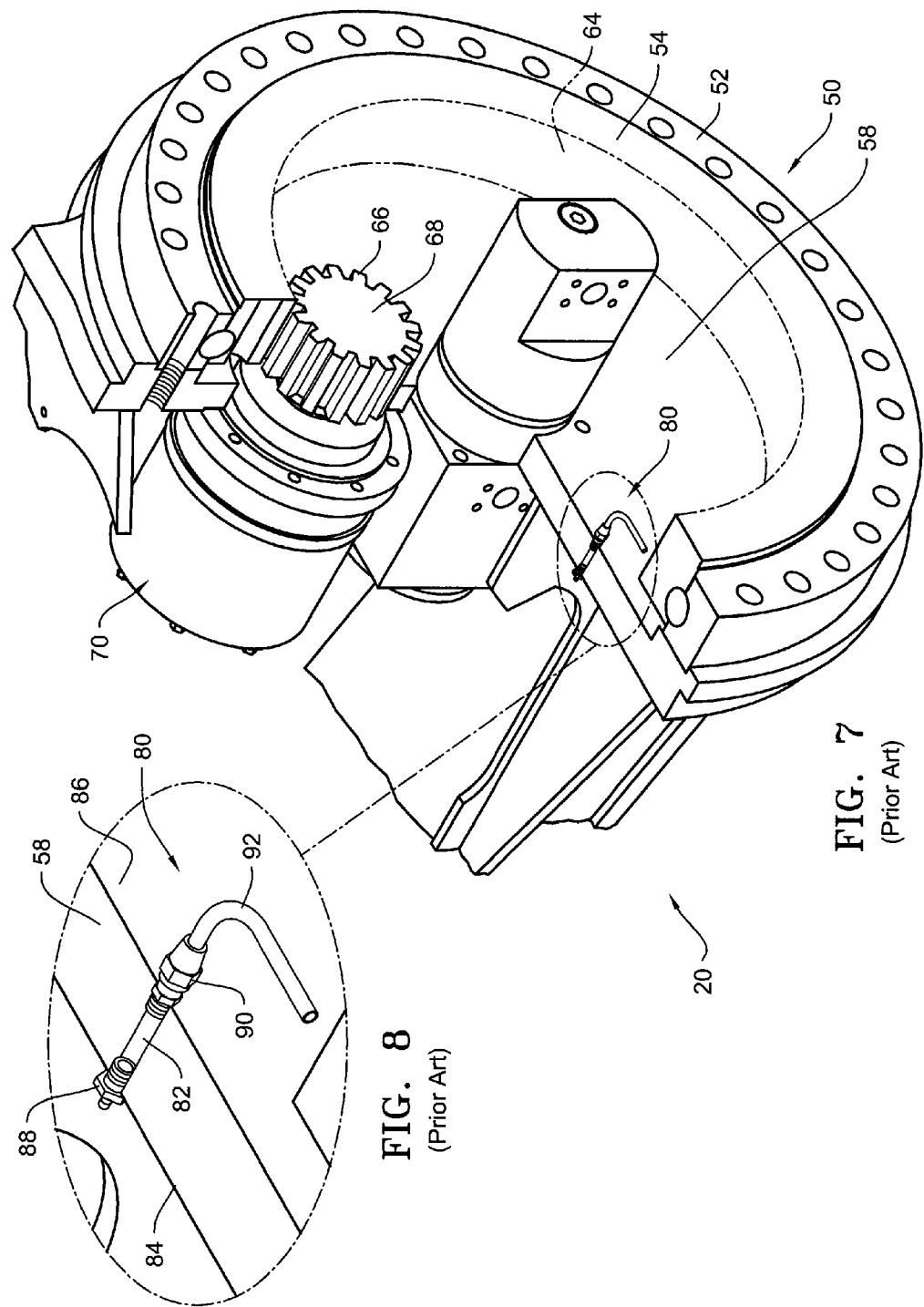
FIG. 7 is a partial cut-away, front perspective view of a swivel attachment showing a prior art slewing ring grease assembly.
FIG. 8 is an enlarged view of the circled area in FIG. 7 showing the prior art slewing ring grease assembly.

FIGS. 7 and 8 illustrate one such prior art grease assembly 80 for providing grease to the gear teeth 64 within the slewing ring 50. The prior art grease assembly 80 involves drilling a hole 82 through the bulkhead 58 and tapping the hole 82 with internal threads from the back side 84 of the bulkhead 58 and from the front side 86 of the bulkhead 58. A grease fitting 88 is threaded into the threaded hole 82 on the back side 84 of the bulkhead 58 and a pipe fitting 90 is threaded into the threaded hole 82 from the front side 86 of the bulkhead 58. The pipe fitting 90 receives one end of copper or steel tube 92 which includes a bend to direct the other end of the tube 92 toward the direction of gear teeth 64 of the internal race 54. With the grease assembly 80 installed, the swivel attachment 20 is then attached to the main body 12 of the material handling attachment 10. Thus, by pumping grease from a grease gun placed over the grease fitting 88, grease is pushed through the hole 82 and into internal tube 92 which directs and delivers the grease to the gear teeth 64 of the internal race 54. While the prior art grease assembly 80 serves its intended purpose, it often fails over time because the internal tube 92 and/or pipe fitting 90 unthreads from the tapped hole 82 due to vibration and rotation of the material handling attachment 10 during use. Once unthreaded, the internal tube 92 will fall inside the slewing ring 50 and will get crushed between the teeth 64, 66 as the internal race 54 rotates which could result in damage and/or increased wear of the gear teeth. Additionally, without the internal tube 92 in place, grease cannot be properly directed and delivered to the gear teeth, resulting in increased wear and decreased life of the slewing ring 50. Furthermore, it should be appreciated that the internal tube 92 cannot be recovered and replaced without removing the slewing ring 50 from the swivel house 22, resulting in considerable down-time.

Figure 5:
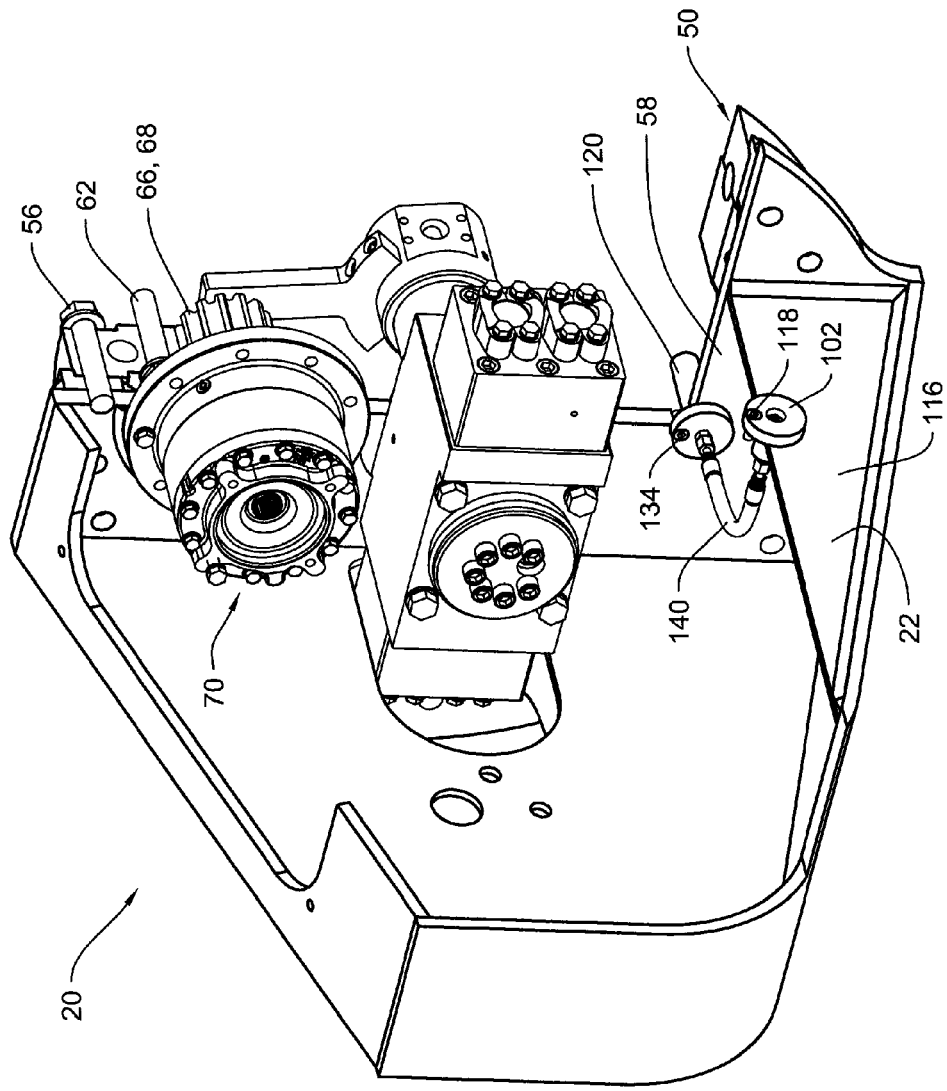
FIG. 5 is a partial cut-away, rear perspective view of the swivel attachment of FIG. 1 showing the embodiment of the improved slewing ring grease assembly of FIG. 4 from the rear.

FIGS. 4-6 illustrate an embodiment of an improved slewing ring grease assembly 100 which will not fail like the prior art grease assembly 80. As best illustrated in FIG. 6, the improved slewing ring grease assembly 100 includes a wall fitting 102 having a flange 104 and shaft 106. A through-bore 108 extends through the wall fitting 102. A grease fitting 110 is threaded into the end of the through-bore 108 of the flange 104 and a pipe fitting 112 is threaded into the through-bore 108 of the shaft 106. The shaft 106 is inserted through a hole 114 in a wall 116 of the swivel house 22 and is secured in place by a threaded connector 118 (FIG. 4) extending through the flange 104 and into the swivel house wall 116. The improved slewing ring grease assembly 100 further includes a bulkhead fitting 120 having a flange 122 and a shaft 124. A passage 126 is provided through the bulkhead fitting. The end of the passage is tapped with internal threads to threadably receive a pipe fitting 130. Depending on the configuration of and orientation of the bulkhead fitting 120, the passage 126 may include a longitudinal passage 127 extending through the flange 122 and into the shaft 124 terminating before the end of the shaft 124 and intersect with a transverse passage 128 extending from the lower quadrant of the shaft 124. The shaft 124 of the bulkhead fitting 120 is inserted through a hole 132 in the bulkhead 58 and projects over the internal gear teeth 64 of the inner race 54. The bulkhead fitting 120 is secured in place by a threaded connector 134 (FIG. 5) extending through the flange 122 and into the backside 84 of the bulkhead 58. A connecting tube 140 connects to the pipe fittings 120, 128 of the respective wall fitting 102 and bulkhead fitting 120. Thus, by pumping grease from a grease gun placed over the grease fitting 110, grease is directed through the through-bore 108, through the connecting tube 140, and out through the passage 126 onto the gear teeth 64 of the internal race 54. The bulkhead fitting 120 is preferably positioned in the lower quadrant of the bulkhead 58 above the gear teeth 64 of the internal race and preferably along a vertical axis of the slewing ring above the gear teeth 64.

In some swivel attachments 20, the slewing ring 50 and bulkhead 58 are of such large diameter that slewing ring 50 and bulkhead 58 extend beyond the walls 116 of the swivel house 22. Thus, in such embodiments, the wall fitting 102 and connecting tube 140 may be eliminated and a grease fitting 110 may be threaded directly into the end of the passage 126 of the bulkhead fitting 120 such that the grease gun can be pumped from a grease gun directly into the grease fitting 110 of bulkhead fitting 120 and out through the passage 126 onto the internal gear teeth of the inner race.

It should also be appreciated that although the improved slewing ring grease assembly 100 is described as being particularly adapted to a swivel attachment 20 for a material handling attachment 10 which is mounted to an excavator, the improved slewing ring grease assembly 100 is equally suitable for use in any application where it is desired to provide grease to internal gear teeth of a slewing ring coupled between any rotatable structure and a non-rotatable structure.

The foregoing description is presented to enable one of ordinary skill in the art to make and use the invention and is provided in the context of a patent application and its requirements. Various modifications to the embodiments described herein, and the general principles and features of the embodiments described herein will be readily apparent to those of skill in the art. Thus, the present invention is not to be limited to the embodiments described herein and illustrated in the drawing figures, but is to be accorded the widest scope consistent with the spirit and scope of the appended claims.

The invention claimed is:

1. A slewing ring grease assembly, comprising:
   a bulkhead fitting having a flange and a shaft, said flange having a diameter larger than said shaft, said shaft extending through a hole in a bulkhead attached to a slewing ring such that said shaft extends over internal gear teeth of said slewing ring, said flange secured to said bulkhead;
   a passage through said flange and shaft of said bulkhead fitting, said passage capable of delivering grease through said bulkhead fitting and onto said internal gear teeth of said slewing ring;
   a wall fitting extending through a wall of a swivel house supporting said bulkhead, said wall fitting having a through-bore and a grease fitting received in one end of the through-bore, wherein said wall fitting includes a wall fitting flange and a wall fitting shaft, said wall fitting flange having a diameter larger than said wall fitting shaft, said wall fitting shaft extending through a hole in a wall of a housing supporting said bulkhead, said wall fitting flange secured to said wall;
a connecting tube coupled to said wall fitting over another end of said through-bore and coupled to said bulkhead fitting flange over an end of said passage, said connecting tube capable of delivering grease from said wall fitting through-bore to said bulkhead fitting passage.

2. The slewing ring grease assembly of claim 1, wherein said passage includes:
a longitudinal passage extending through said flange and into said shaft; and
a transverse passage extending into said shaft and intersecting said longitudinal passage.

3. The slewing ring grease assembly of claim 1, wherein a grease fitting is threadably received in one end of said passage adjacent said flange.

4. The slewing ring grease assembly of claim 1, wherein said connecting tube is connected to said another end of said through-bore by a first pipe fitting and to said bulkhead fitting flange over said end of said passage by a second pipe fitting.

5. A grease assembly for greasing gear teeth of a slewing ring attached to a bulkhead of a swivel house, said grease assembly comprising:
a bulkhead fitting having a flange and a shaft, said flange having a diameter larger than said shaft, said shaft extending through a hole in the bulkhead of the swivel house such that said shaft extends over the internal gear teeth of the slewing ring, said flange secured to said bulkhead;
a passage through said flange and shaft of said bulkhead fitting, said passage capable of delivering grease through said bulkhead fitting and onto the internal gear teeth of the slewing ring;
a wall fitting extending through a wall of the swivel house, said wall fitting having a through-bore and a grease fitting received in one end of the through-bore, wherein said wall fitting includes a wall fitting flange and a wall fitting shaft, said wall fitting flange having a diameter larger than said wall fitting shaft, said wall fitting shaft extending through a hole in a wall of the swivel house, said wall fitting flange secured to said wall of the swivel house;
a connecting tube coupled to said wall fitting over another end of said through-bore and coupled to said bulkhead fitting flange over an end of said passage, said connecting tube capable of delivering grease from said wall fitting through-bore to said bulkhead fitting passage.

6. The grease assembly of claim 5, wherein said passage includes:
a longitudinal passage extending through said flange and into said shaft; and
a transverse passage extending into said shaft and intersecting said longitudinal passage.

7. The grease assembly of claim 5, wherein a grease fitting is threadably received in one end of said passage adjacent said flange.

8. The grease assembly of claim 5, wherein said connecting tube is connected to said another end of said through-bore by a first pipe fitting and to said bulkhead fitting flange over said end of said passage by a second pipe fitting.

9. The grease assembly of claim 5 wherein said bulkhead fitting extends through a lower quadrant of the bulkhead and proximate the internal gear teeth.

10. The grease assembly of claim 5 wherein said bulkhead fitting extends through the bulkhead proximate a vertical axis of the slewing ring and proximate the internal gear teeth.

11. A swivel attachment, comprising:
a swivel house having a wall and a bulkhead;
a slewing ring mounted to said bulkhead;
a bulkhead fitting having a flange and a shaft, said flange having a diameter larger than said shaft, said shaft extending through a hole in said bulkhead such that said shaft extends over internal gear teeth of said slewing ring, said flange secured to said bulkhead;
a passage through said flange and shaft of said bulkhead fitting, said passage capable of delivering grease through said bulkhead fitting and onto said internal gear teeth of said slewing ring;
a wall fitting extending through a wall of said swivel house, said wall fitting having a through-bore and a grease fitting received in one end of said through-bore, wherein said wall fitting includes a wall fitting flange and a wall fitting shaft, said wall fitting flange having a diameter larger than said wall fitting shaft, said wall fitting shaft extending through a hole in said wall of said swivel house, said flange secured to said wall of said swivel house;
a connecting tube coupled to said wall fitting over another end of said through-bore and coupled to said bulkhead fitting flange over an end of said passage, said connecting tube capable of delivering grease from said wall fitting through-bore to said bulkhead fitting passage.

12. The swivel attachment of claim 11, wherein said passage includes:
a longitudinal passage extending through said flange and into said shaft; and
a transverse passage extending into said shaft and intersecting said longitudinal passage.

13. The swivel attachment of claim 11, wherein a grease fitting is threadably received in one end of said passage adjacent said flange.

14. The swivel attachment of claim 11, wherein said connecting tube is connected to said another end of said through-bore by a first pipe fitting and to said bulkhead fitting flange over said end of said passage by a second pipe fitting.

15. The swivel attachment of claim 11 wherein said bulkhead fitting extends through a lower quadrant of the bulkhead and proximate said internal gear teeth of said slewing ring.

16. The swivel attachment of claim 11 wherein said bulkhead fitting extends through said bulkhead proximate a vertical axis of said slewing ring and proximate said internal gear teeth.

17. A material handling attachment adapted to be mountable to a boom of an excavator, comprising:
a main body having a forward end and a rearward end;
a slewing ring mounted to said rearward end of said main body;
a swivel house having a bulkhead, said bulkhead mounted to a rearward end of said slewing ring;
a bulkhead fitting having a flange and a shaft, said flange having a diameter larger than said shaft, said shaft extending through a hole in said bulkhead such that said shaft extends over internal gear teeth of said slewing ring, said flange secured to said bulkhead;

a passage through said flange and shaft of said bulkhead fitting, said passage capable of delivering grease through said bulkhead fitting and onto said internal gear teeth of said slewing ring;

a wall fitting extending through a wall of said swivel house, said wall fitting having a through-bore and a grease fitting received in one end of said through-bore, wherein said wall fitting includes a wall fitting flange and a wall fitting shaft, said wall fitting flange having a diameter larger than said wall fitting shaft, said wall fitting shaft extending through a hole in said wall of said swivel house, said wall fitting flange secured to said wall of said swivel house;

a connecting tube coupled to said wall fitting over another end of said through-bore and coupled to said bulkhead fitting flange over an end of said passage, said connecting tube capable of delivering grease from said wall fitting through-bore to said bulkhead fitting passage.

18. The material handling attachment of claim 17, wherein said passage includes:

a longitudinal passage extending through said flange and into said shaft; and a transverse passage extending into said shaft and intersecting said longitudinal passage.

19. The material handling attachment of claim 17, wherein a grease fitting is threadably received in one end of said passage adjacent said flange.

20. The material handling attachment of claim 17, wherein said connecting tube is connected to said another end of said through-bore by a first pipe fitting and to said bulkhead fitting flange over said end of said passage by a second pipe fitting.

21. The material handling attachment of claim 17 wherein said bulkhead fitting extends through a lower quadrant of the bulkhead and proximate said internal gear teeth of said slewing ring.

22. The material handling attachment of claim 17 wherein said bulkhead fitting extends through said bulkhead proximate a vertical axis of said slewing ring and proximate said internal gear teeth.

* * * * *